United States Patent [19]

Bier et al.

[11] 4,223,106
[45] Sep. 16, 1980

[54] BLOCK COPOLYESTERS WHICH CRYSTALLIZE RAPIDLY

[75] Inventors: Peter Bier; Rudolf Binsack, both of Krefeld; Dieter Rempel, Leverkusen, all of Fed. Rep. of Germany

[73] Assignee: Bayer Aktiengesellschaft, Krefeld, Fed. Rep. of Germany

[21] Appl. No.: 730,208

[22] Filed: Oct. 6, 1976

[30] Foreign Application Priority Data

Oct. 11, 1975 [DE] Fed. Rep. of Germany ....... 2545720

[51] Int. Cl.² .............................................. C08F 8/00
[52] U.S. Cl. .................................. 525/173; 525/166; 525/176
[58] Field of Search ..................... 260/75 R, 860, 873; 525/166, 173, 176

[56] References Cited

U.S. PATENT DOCUMENTS

| 2,744,087 | 5/1956 | Snyder | 260/75 R |
|---|---|---|---|
| 3,719,729 | 3/1973 | LeParanthoen et al. | 260/873 |
| 3,766,146 | 10/1973 | Witsiepe | 260/860 |
| 3,784,520 | 1/1974 | Hoeschele | 260/860 |
| 3,843,752 | 10/1974 | Katayama et al. | 260/873 |
| 3,849,515 | 11/1974 | Muller | 260/860 |
| 3,932,326 | 1/1976 | Hoh | 260/860 |
| 3,954,689 | 5/1976 | Hoeschele | 260/860 |
| 3,957,905 | 5/1976 | Sumoto | 260/860 |
| 3,959,062 | 5/1976 | Hoh | 260/860 |
| 4,048,128 | 9/1977 | Eastman | 260/860 |
| 4,081,494 | 3/1978 | Sakai | 260/860 |
| 4,086,212 | 4/1978 | Bier | 260/45.7 P |
| 4,107,149 | 8/1978 | Bier | 260/45.7 P |
| 4,116,925 | 9/1978 | Brachman | 260/873 |

OTHER PUBLICATIONS

The Effect of Branched Codiols on the Crystallization Behavior of Aromatic Polyesters, published in Angewandte Makromolekulare Chemie 65, (1977) 121 No. 1005 Bayer AG, Bier et al.

Primary Examiner—Melvyn I. Marquis
Attorney, Agent, or Firm—Gene Harsh; Lawrence S. Pope

[57] ABSTRACT

Polyethylene terephthalate copolymers comprising (I) blocksegments having a glass transition temperature below 0° C. and (II) polyethylene terephthalate segments modified with certain diols having 3 to 10 carbon atoms, have an excellent rate of crystallization and necessitate mould temperatures of below 100° C.

13 Claims, No Drawings

BLOCK COPOLYESTERS WHICH CRYSTALLIZE RAPIDLY

The present invention relates to highly crystalline, thermoplastic block copolyesters which crystallise rapidly and are based on terephthalic acid, ethylene glycol and codiol residues and a further component which is incorporated as a block segment.

Polyalkylene terephthalates have achieved considerable importance as raw materials for the preparation of fibres, films and mouldings. Because of their partially crystalline structure they possess outstanding properties, such as high resistance to wear, advantageous vehaviour under long period stressing and high dimensional accuracy and are therefore particularly suitable for the preparation of shaped parts which are subject to high mechanical and heat stress. An additional improvement in the mechanical properties can be achieved by the incorporation of reinforcing materials, for example glass fibres (British Pat. No. 1,111,012, U.S. Pat. No. 3,368,995 and German Auslegeschrift (German Published Specification) No. 2,042,447).

Because of its special physical properties, polyethylene terephthalate is particularly suitable for the preparation of fibre products and films. However, for the preparation of mouldings, the fact that high mould temperatures (about 140° C.) and relatively long compression times are necessary is a disadvantage which is only partially compensated by exceptional rigidity and a high heat distortion point.

It is true that polypropylene terephthalate and polybutylene terephthalate require shorter compression times and lower mould temperatures (about 100° C.) than polyethylene terephthalate since they crystallise considerably more rapidly but, compared with polyethylene terephthalate, they have poorer physical properties and in particular a lower heat distortion point.

There has been no lack of attempts to provide polycondensation products in which the good properties of both polyethylene terephthalate and of polypropylene terephthalate and polybutylene terephthalate are combined; thus, for example, it is known that the tendency of polyethylene terephthalate to crystallise can be improved by nucleation with suitable nucleating agents and/or increasing the rate of diffusion within the melt by adding lubricants (compare K.-D. Asmus in Kunststoff-Handbuch (Plastics Handbook), Volume VIII, "Polyesters", page 697 et seq., Carl Hanser Verlag, Munich 1973). However, these measures are not suitable for increasing the rate of crystallisation of polyethylene terephthalate to such an extent that it can be processed at similarly low mould temperatures and short moulding times as can polybutylene terephthalate.

It has now been found, surprisingly, that it is possible to lower the mould temperatures to below 100° C., whilst retaining the good crystallisation properties, and thus to use moulds heated by water, when plasticising block segments which have a transition temperature below 0° are additionally incorporated into special polyesters.

The invention relates to a highly crystalline thermoplastic block copolyester which crystallises rapidly, has an intrinsic viscosity of at least 0.4 dl/g and comprises 60 to 95% by weight, based on the weight of the sum of components A and B, of a component A and 40 to 5% by weight, based on the weight of the sum of components A and B, of a component B consisting of block segments which are linked to component A and have a glass transition temperature below 0° C. and an average molecular weight of 400 to 1,000,000, components A and B being linked to each other via carboxylate groups, in which component A consists of copolymer segments comprising (a) at least 90 mol %, based on the acid component, of terephthalic acid residues, (b) 90 to 99.5 mol %, based on the sum of (b)+(c), of ethylene glycol residues and (c) 10 to 0.5 mol %, based on the sum of (b)+(c), of residues of codiols which have 4 to 10 carbon atoms and in which the OH groups are separated by aliphatic branched or unbranched alkylene groups with 3 or 4 carbon atoms and which either carry at least one secondary or tertiary OH group, or carry two primary OH groups and are unsubstituted or monosubstituted or disubstituted by alkyl and if monosubstituted or disubstituted by alkyl the sum of the carbon atoms in the substituents is at least 4.

Suitable block segments A are terephthalic acid copolyesters which have an average molecular weight of 5,000–50,000 (according to the light scattering method in trifluoroacetic acid).

Possible block segments B are the following polymer segments, or mixtures thereof:

1. Linear and/or branched polyolefins which are obtained from olefines with 2–5 C atoms and have an average molecular weight of about 400 up to $10^6$ (values up to 10,000 determined by vapour pressure osmometry, values above 10,000 and up to 200,000 determined by membrane osmometry and values above 200,000 determined by the light scattering method), such as polyisobutylenes, polyisoprenes, polybutadienes, polypropylenes and polyethylenes with functional carboxyl groups.

2. Polyalkylene glycols (more precisely: poly-(alkylene oxide)-$\omega$, $\omega'$-diols) which have an average molecular weight of about 400 up to 100,000, preferably of 2,000 up to 25,000 (values up to 20,000 determined by determination of the OH end groups and values up to 100,000 determined by membrane osmometry) and a carbon/oxygen ratio of about 2.0 to 4.5, such as polyethylene glycols, polypropylene glycols and polybutylene glycols.

Preferred possible codiols c) are diols which have at least one secondary or tertiary OH group, such as 3-methylpentane-2,4-diol, 2-methylpentane-2,4-diol, 2,2,4-trimethylpentane-1,3-diol, hexane-2,5-diol and butane-1,3-diol, but, inasmuch as they are unsubstituted or mono- or disubstituted diols as specific above, diols which have two primary OH groups, such as, for example, 2,2-diethylpropanediol, butane-1,4-diol and propane-1,3-diol, are also suitable. The positive action of the residues of the codiols listed on the rate of crystallisation of the block copolyesters according to the invention decreases in the indicated sequence.

The polycondensation products according to the invention crystallise considerably more rapidly than pure polyethylene terephthalate and possess a very high melting point, that is to say they possess a combination of properties which is highly desirable and has not been achieved by the terephthalic acid esters known hitherto.

They can be moulded at mould temperatures between 120° and 80° C., preferably at about 90° C., and, under these conditions, permit a substantially shorter cycle time (namely 30 to 35 seconds) then conventional polyethylene terephthalates containing nucleating agents. The rate of crystallisation can be even further increased by the addition of nucleating agents.

Moreover, compared with a conventional mixture of polyethylene terephthalate and a second polymer (German Offenlegungsschriften (Published Specifications) Nos. 2,109,560, 2,255,654, 2,310,034, 2,330,022 and 2,364,318), the block copolyesters according to the invention have the decisive advantage that, because of their more rapid rate of crystallisation and their greater crystallinity, they are substantially more stable towards oxidative and hydrolytic influences. However, this also means that polymers which are unstable to oxidation when hot, such as polyalkylene glycols, especially polypropylene glycols and polyethylene glycols, can be used as block segments B without the decomposition which occurs during processing by injection moulding at a stock temperature of 260° C. being greater than that in the case of pure polyethylene terephthalate. A copolymer which consists of pure polyethylene terephthalate and a polyalkylene glycol (British Pat. No. 682,866 and U.S. Pat. No. 2,744,087) can also not be processed without decomposition under the above conditions. A drastic reduction in the molecular weight takes place. The mouldings obtained therefrom are fragile and brittle.

In addition to terephthalic acid residues, the polyesters can contain up to 10 mol %, based on the acid component, of residues of other aromatic, aliphatic or cycloaliphatic dicarboxylic acids with 4–14 C atoms, such as, for example, phthalic acid, isophthalic acid, naphthalene-2,6-dicarboxylic acid, diphenyl-4,4′-dicarboxylic acid, adipic acid, sebacic acid and cyclohexanediacetic acid.

The copolyesters according to the invention can be prepared in a manner which is in itself known by esterifying or trans-esterifying the dicarboxylic acids, preferably pure terephthalic acid, and/or the corresponding dimethyl esters with 1.05 to 4.0, preferably 1.8–3.6, mols, based on 1 mol of the dicarboxylic acid component, of the diols, with the addition of the polymer which is to be incorporated chemically as the block segment, at between 150° and 250° C. in the presence of esterification and/or trans-esterification catalysts (reaction step I) and effecting polycondensation of the reaction products, thus obtained, under customary conditions, that is to say in the presence of esterification catalysts at between 200° and 300° C. under reduced pressure (<1 mm Hg) (reaction step II). The segments A as well as the segments B can be co-condensed endgroups of the copolymers according to the invention.

A particularly preferred embodiment consists in admixing the codiols, together with the block segment polymers, to the reaction mixture as late as possible, that is to say only after the reaction of terephthalic acid, or its ester-forming derivatives, with ethylene glycol to give bis-(2-hydroxyethyl) terephthalate has taken place or, even more advantageously, only after a polyethylene terephthalate prepolymer which has a degree of polymerisation of more than 4 has formed. Thereafter, the mixture can then be subjected to polycondensation in the customary manner, as described above.

All the known catalysts can be employed for the esterification reaction and for the polycondensation reaction, for example: monomeric and/or polymeric tetraalkyl titanates containing alkyl radicals with 1 to 10 C atoms, for example tetrabutyl titanate and tetraisopropyl titanate, acetates of monovalent and divalent metals such as zinc, manganese, calcium, cobalt, lead, cadmium, sodium and lithium, compounds of trivalent antimony, such as antimony trioxide, antimony triacetate and antimony trichloride, compounds which are derived from antimony and glycols, compounds of trivalent boron, such as boric acid, boric anhydride and borates, compounds which are derived from boron and glycols, compounds of tetravalent germanium, such as amorphous germanium dioxide and germanium tetrachloride, and compounds which are derived from germanium and glycols, or mixtures of the said catalysts.

Preferred catalysts for the preparation of the copolyesters according to the invention are the acetates of zinc, manganese, cadmium and calcium, germanium compounds, such as germanium dioxide, especially as a solution in glycol, boron compounds, such as boric anhydride or borates, antimony compounds, such as antimony trioxide, especially as a solution in glycol, and titanium compounds, such as tetraalkyl titanates, for example tetraisopropyl titanate, or combinations of the said compounds.

In order to provide protection against thermo-oxidative degradation, the customary amounts, preferably 0.001 to 0.5% by weight, based on the copolyesters, of known stabilisers can be added to the copolyesters according to the invention. Suitable stabilisers are phenols and phenol derivatives, preferably sterically hindered phenols, amines, preferably secondary arylamines and their derivatives, quinones, phosphites and phosphates, preferably aryl derivatives, copper salts of organic acids and addition compounds of Cu-I halides with phosphites.

In order to achieve a high molecular weight, the copolyesters according to the invention can, in the solid state, be subjected to post-condensation. Usually, the granulated product is post-condensed in a rotary apparatus in vacuo under a pressure of less than 1 mm Hg or in a stream of nitrogen and at a temperature which is 60°–5° C. below the melting point of the polymer.

The copolyesters according to the invention can, of course, be reinforced with reinforcing materials. Metals, silicates, carbon and glass, mainly in the form of fibres, fabrics or mats, have proved useful as reinforcing materials. Glass fibres are the preferred reinforcing material.

In addition, inorganic or organic pigments, dyestuffs, lubricants and release agents, such as zinc stearate, UV absorbers and the like, can, of course, be added in the customary amounts, if desired.

In order to obtain flame-resistant products, 2 to 20% by weight, based on the moulding composition, of flameproofing agents which are in themselves known, such as, for example, compounds containing halogen, elementary phosphorus or phosphorus compounds, phosphorus-nitrogen compounds, antimony trioxide or mixtures of these substances, preferably antimony trioxide, decabromodiphenyl ether and tetrabromobisphenol-A polycarbonate, are added.

The rate of crystallisation of the copolyesters according to the invention can be further increased by the addition of 0.01 to 1% by weight, based on the copolyesters which have not been filled and are not reinforced, of nucleating agents. Suitable nucleating agents are the compounds known to those skilled in the art, such as the compounds described in, for example, Kunststoff Handbuch (Plastics Handbook), Volume VIII, "Polyesters", Carl Hanser Verlag, Munich 1973, page 701.

The copolyesters according to the invention are excellent starting materials for the preparation of films and fibres and preferably for the preparation of mouldings of all types by injection moulding.

EXAMPLES 1-5

5,826 g (30 mols) of dimethyl terephthalate and 4,104 g (66 mols) of ethylene glycol are heated, in the presence of 4.62 g of calcium acetate, at 200° C. in a 25 l autoclave for 2 hours, whilst stirring and passing nitrogen over the mixture, whereupon methanol distils off. After the trans-esterification has ended, 36 ml of a $GeO_2$ solution (5% strength by weight in ethylene glycol), 6 g of trisnonylphenyl phosphite, 219 g of 2,2,4-trimethylpentane-1,3-diol and 600 g (10% by weight) of the corresponding block segment polymer are added. The temperature is raised to 210° C. and maintained at this value for 2 hours. The temperature is then raised to 250° C. in the course of a further one hour and, at the same time, a vacuum (1.0 mm Hg) is applied to the apparatus. Finally, the mixture is stirred for a further 2 hours at 250° C. and under a pressure of less than 0.5 mm Hg. The polyester melt is then spun off through a waterbath and granulated.

Table 1 lists the thermodynamic data characteristic for the crystallisation properties of several polyethylene glycol-2,2,4-trimethylpentane-1,3-diol terephthalic acid esters which have a lowered transition temperature (Example 1-4). Example 5 and 6 show the corresponding data for pure polyethylene terephthalate and polybutylene terephthalate.

Example 7, 8 and 9 in Table 2 show the good properties of the terephthalic acid block copolyesters on post-condensation in the solid phase (220° C., 0.3 mm Hg) compared with those of pure polyethylene terephthalate (Example 10).

The symbols used in the Table have the following meanings:

[$\eta$] Intrinsic viscosity in 1:1 phenol/tetrachloroethane, measured in Ubbelohde capillary viscometer, polymer concentration: 0.5 g/dl, temperature 25° C.
$\Delta H_m$: Enthalpy of melting
$T_m$: Melting point
$\Delta H_c$: Enthalpy of crystallisation
$T_c$: Crystallisation temperature, measured with a DSC 2 (Perkin Elmer) using a sample weight of about 10 mg and a rate of heating and cooling of 20° C./minute
Polywax 2,000: Polyethylene glycol
Manufacturer: Chem.Werke HUML /u/ ls, Marl ($\overline{M}_n$=2,000)
Polywax 6,000: Polyethylene glycol
Manufacturer: Chem.Werke HUML /u/ ls, Marl ($\overline{M}_n$=6,000)
Polywax 20,000: Polyethylene glycol
Manufacturer: Chem.Werke HUML /u/ ls, Marl ($\overline{M}_n$=20,000)
Polyethylene: polyethylene which has been subjected to thermooxidative degradation and contains carboxyl end groups, molecular weight: 80,000–100,000

TABLE 2

| | | [$\eta$] after | | |
|---|---|---|---|---|
| Example | Co-component | 0 hours | 5 hours | 10 hours |
| 7 | 10% by weight of polywax 2,000 | 0.70 | 0.77 | 0.81 |
| 8 | 10% by weight of polywax 20,000 | 0.72 | 0.8 | 0.83 |
| 9 | 15% by weight of polyethylene | 0.55 | 0.72 | 0.84 |
| 10 | pure polyethylene terephthalate | 0.67 | 0.7 | 0.72 |

We claim:
1. Highly crystalline, thermoplastic block copolyesters which crystallise rapidly, have an intrinsic viscosity of at least 0.4 dl/g and consist of (A) 60-95% by weight, based on the sum of A and B, of copolyester segments based on terephthalic acid, ethylene glycol and codiol residues and (B) 40-5% by weight, based on the sum of A and B, of block segments which are linked to A and have a glass transition temperature below 0° C. and an average molecular weight of 400 to 1,000,000, A and B being linked to one another via ester groups, characterised in that A comprises (a) at least 90 mol %, based on the acid component, of terephthalic acid residues, (b) 90-99.5 mol %, based on the sum of (b)+(c), of ethylene glycol residues and (c) 10-0.5 mol %, based on the sum of (b)+(c), of residues of codiols which have 4-10 C atoms and in which the OH groups are separated by

TABLE 1

| Example | Co-component | [$\eta$] dl/g | $\Delta H_m$ cal/g | $T_m$ °C. | $\Delta H_c$ cal/g | $T_c$ °C. | $T_c$ reduced for intrinsic viscosity = 0.55 dl/g | $T_m$-$T_c$ reduced for intrinsic viscosity = 0.55 dl/g | $T_g$ °C. |
|---|---|---|---|---|---|---|---|---|---|
| 1 | 10% by weight of polywax 2,000 | 0.81 | 8.6 | 240 | 8.6 | 177 | 197 | 43 | 50 |
| 2 | 10% by weight of polywax 6,000 | 0.87 | 8.9 | 242.5 | 8.9 | 185.5 | 211 | 31.5 | 50 |
| 3 | 10% by weight of polywax 20,000 | 0.81 | 9.6 | 256.5 | 9.6 | 205.5 | 226 | 30.5 | 48 |
| 4 | 15% by weight of Polyethylene | 0.84 | 8.2 | 250 | 8.2 | 184 | 210 | 40 | 50 |
| 5 | pure polybutylene terephthalate | 0.87 | 9.2 | 226 | 9.2 | 173 | 181 | 45 | 45 |
| 6 | pure polyethylene terephthalate 0.72 | | 7.8 | 255 | 2.9 | 152 | 164 | 91 | 75 | aliphatic branched or unbranched alkylene groups with 3 or 4 C atoms and which either (1) carry at least one secondary or tertiary OH group or (2) carry two primary OH groups and are unsubstituted or monosubstituted or disubstituted by alkyl, the sum of the C atoms in the substituents, in the case of substitution, being at least 4.

2. Block copolyesters according to claim 1, characterised in that the block segments B, which are linked via ester structures, are linear and/or branched polyolefines which are obtained from olefines with 2-5 C atoms and have an average molecular weight of about 400 up to 1,000,000.

3. Block copolyesters according to claim 1, characterised in that the block segments B, which are linked via ester structures, are polyalkylene glycol units which have a carbon/oxygen ratio of about 2.0 to 4.5 and an average molecular weight of about 400 to 100,000.

4. Block copolyesters according to claim 1, characterised in that 3-methylpentane-2,4-diol, 2-methylpentane-2,4-diol or 2,2,4-trimethylpentane-1,3-diol is used as the codiol.

5. Process for the preparation of highly crystalline, thermoplastic block copolyesters which crystallise rapidly, according to claim 1, characterised in that, per mol of terephthalic acid and/or terephthalic acid dimethyl ester, up to 10 mol % of which, based on the dicarboxylic acid component, can be replaced by other aromatic, cycloaliphatic or aliphatic dicarboxylic acids, or their dimethyl ester, 1.05 to 4.0 mols of diols, which consist to the extent of 90 to 99.5 mol %, based on the diol components, of ethylene glycol and to the extent of 0.5 to 10 mol %, based on the diol components, of codiols according to claim 1(c), are esterified or transesterified, together with the block segment polymer B, which has a transition temperature below 0° C. and an average molecular weight of 400 to 1,000,000, in a manner which is in itself known at between 150°–250° C. in the presence of esterification and/or trans-esterification catalysts and the reaction products, thus obtained, are subjected to polycondensation in the presence of esterification catalysts at between 200° and 300° C. under reduced pressure.

6. Process according to claim 5, characterised in that the codiol, together with the block segment polymer, is added only after the reaction of terephthalic acid, or its ester-forming derivatives, with ethylene glycol to give bis-(2-hydroxyethyl) terephthalate has taken place, and the reaction products are subjected to polycondensation under conditions which are in themselves known.

7. Process according to claim 5, characterised in that the terephthalic acid copolyester which has an intrinsic viscosity of at least 0.4 dl/g is post-condensed in the solid phase, in vacuo or in a stream of nitrogen and at a temperature which is 60°–5° C. below the melting point of the polymer.

8. The process of claim 6 wherein the codiol and the block segment polymer are added only after the formation of a polyethylene prepolymer with a degree of polymerization greater than 4 but before the polycondensation step.

9. A highly crystalline, thermoplastic block copolyester which crystallizes rapidly, having an intrinsic viscosity of at least 0.4 dl/g and consisting of
(A) 60 to 95 wt.% of a copolyester segment consisting of
  (1) an acid component comprising at least 90 mol % of terephthalic acid residues and
  (2) a diol component consisting of
    (a) 90 to 99.5 mol % of ethylene glycol residues, and
    (b) 10 to 0.5 mol % of residues of codiols which have
      (i) 4 to 10 carbon atoms,
      (ii) 3 to 4 carbon atoms separating the OH groups,
      (iii) at least one secondary or tertiary OH group or two primary OH groups, and
      (iv) no substituents or one or two substituents, said substituents when present having a total of at least 4 carbon atoms, and
(B) 40 to 5 wt. % of block segments which
  (1) have a glass transition temperature of below 0° C.,
  (2) have an average molecular weight of 400 to 1,000,000, and
  (3) are linked to the copolyester segments via ester groups.

10. A process for the preparation of thermoplastic block copolyesters which crystallize rapidly which comprises reacting
(A) An acid component comprising at least 90 mol % of terephthalic acid or dimethyl terephthalate, the balance, if any, being selected from aromatic, cycloaliphatic, and aliphatic dicarboxylic acids and their dimethylesters with,
(B) A diol component comprising
  (1) 90 to 99.5 mol % of ethylene glycol, and
  (2) 10 to 0.5 mol % of codiols which have
    (i) 4 to 10 carbon atoms,
    (ii) 3 to 4 carbon atoms separating the OH groups,
    (iii) at least one secondary or tertiary OH group or two primary OH groups, and
    (iv) no substituent or one or two substituents, said substituents when present having a total of at least 4 carbon atoms, and
(C) 40 to 5 wt % based on the total weight of reactants of block segments which
  (1) have a glass transition temperature of below 0° C.,
  (2) an average molecular weight of 400 to 1,000,000, and
  (3) terminal hydroxy or carboxy groups, at a diol to acid mol ratio of 1.05 to 4.0 at temperatures of 150° to 250° C. in the presence of esterification or transesterification catalysts to an intrinsic viscosity of at least 0.4 dl/g, said codiols being added only after the acid component has reacted with the ethylene glycol to give bis-(2-hydroxy-ethyl) terephthalate.

11. The process of claim 10 wherein said codiols are added only after the formation of a polyethylene terephthalate prepolymer with a polymerization of ≧4.

12. Highly crystalline, thermoplastic block copolyesters which crystallise rapidly, have an intrinsic viscosity of at least 0.4 dl/g and consist of (A) 60–95% by weight, based on the sum of A and B, of copolyester segments based on terephthalic acid, ethylene glycol and codiol residues and (B) 40–5% by weight, based on the sum of A and B, of block segments which are linked to A and have a glass transition temperature below 0° C. and an average molecular weight of 400 to 1,000,000, A and B being linked to one another via ester groups, characterized in that A comprises (a) at least 90 mol %, based on the acid component, of terephthalic acid residues, (b) 90–99.5 mol %, based on the sum of (b)+(c), of ethylene glycol residues and (c) 10–0.5 mol %, based on the sum of (b)+(c), of residues of codiols which have 4–10 C atoms and in which the OH groups are separated by aliphatic branched or unbranched alkylene groups with 3 or 4 C atoms and which carry at least one secondary or tertiary OH group.

13. Highly crystalline, thermoplastic block copolyesters which crystallise rapidly, have an intrinsic viscosity of at least 0.4 dl/g and consist of (A) 60–95% by weight, based on the sum of A and B, of copolyester segments based on terephthalic acid, ethylene glycol and codiol residues and (B) 40–5% by weight, based on the sum of A and B, of block segments which are linked to A and have a glass transition temperature below 0° C. and an average molecular weight of 400 to 1,000,000, A and B being linked to one another via ester groups, characterized in that A comprises (a) at least 90 mol %, based on the acid component, of terephthalic acid residues, (b) 90–99.5 mol %, based on the sum of (b)+(c), of ethylene glycol residues and (c) 10–0.5 mol %, based on the sum of (b)+(c), of residues of codiols selected from the group consisting of 3-methyl-pentane-2,4-diol; 2-methyl pentane-2,4-diol; 2,2,4-trimethyl-pentane-1,3-diol; hexane-2,5-diol; 2,2-diethylpropane-1,3-diol; propane-1,3-diol; and butane-1,3-diol.

* * * * *